US006763997B2

(12) United States Patent
Bennett et al.

(10) Patent No.: US 6,763,997 B2
(45) Date of Patent: Jul. 20, 2004

(54) DOCUMENTED ITEM DESTRUCTION SYSTEMS AND METHODS

(75) Inventors: Bruce A. Bennett, Omaha, NE (US); Scott J. Smith, Fremont, NE (US); Henry Abelman, Roswell, GA (US); Kenneth Algiene, Littleton, CO (US); Mike Jeronimus, Highlands Ranch, CO (US)

(73) Assignee: First Data Corporation, Englewood, CO (US)

(*) Notice: Subject to any disclaimer, the term of this patent is extended or adjusted under 35 U.S.C. 154(b) by 0 days.

(21) Appl. No.: 10/222,132

(22) Filed: Aug. 16, 2002

(65) Prior Publication Data

US 2003/0146275 A1 Aug. 7, 2003

Related U.S. Application Data

(63) Continuation-in-part of application No. 10/072,379, filed on Feb. 5, 2002.

(51) Int. Cl.[7] ................................................ G06F 17/00

(52) U.S. Cl. ........................ 235/375; 235/476; 209/547

(58) Field of Search ............................ 235/375, 462.01, 235/376, 454, 475, 476; 209/583, 534, 547, 551

(56) References Cited

U.S. PATENT DOCUMENTS 4,447,715 A * 5/1984 Vulcano ..................... 235/454
4,828,188 A * 5/1989 Snyder ........................ 241/36
4,864,114 A * 9/1989 Eriane et al. ............... 235/480
6,550,701 B1 * 4/2003 Chang ......................... 241/36
2003/0146275 A1 * 8/2003 Bennett et al. ............. 235/376

FOREIGN PATENT DOCUMENTS

JP 10057601 A * 3/1998 ............. A63F/7/02
JP 2001148070 A * 5/2001 ........... G07F/17/32

OTHER PUBLICATIONS

Internet, SEM Commercial Application Products Page, Security Engineered Machinery; Credit Card/I.D. Badge Destruction, www/semshred.com, Apr. 5, 2002.*

Internet, Security Engineered Machinery Product Comparisons Page, Security Engineered Machinery, CreditCard Destruction Systems, www.semshred.com, Apr. 5, 2002.*

* cited by examiner

*Primary Examiner*—Diane I. Lee
(74) *Attorney, Agent, or Firm*—Townsend and Townsend and Crew LLP

(57) ABSTRACT

A card destruction system includes a reader to read identification information from a card. A controller is coupled to the reader to receive the identification information and to determine whether the card is to be destroyed. A delivery sensor is coupled to the controller to sense when the aid is delivered to a card destruction device. The controller is also configured to produce a record of the destruction based on a signal from the sensor.

23 Claims, 9 Drawing Sheets

DOCUMENTED ITEM DESTRUCTION SYSTEMS AND METHODS

CROSS REFERENCE TO RELATED APPLICATIONS

This application is a continuation-in-part application and claims the benefits of U.S. application Ser. No. 10/072,379, filed Feb. 5, 2002, the complete disclosure of which is herein incorporated by reference.

BACKGROUND OF THE INVENTION

This invention relates generally to the field of item destruction. More specifically, the invention relates to automated systems and methods to verify that an item is intended to be destroyed and to produce an audit record of the destruction.

A variety of organizations issue cards to their customers. For example, such organizations may issue credit cards, debit cards, smart cards, loyalty cards and the like to their customers. Often, such organizations contract with another company to produce and mail such cards to the end consumer. For a variety of reasons, once produced some of the cards may need to be destroyed. For instance, some cards may be returned by the postal service as being undeliverable, the customer's account may be closed, or the like.

While such cards can be manually destroyed, such a process is time intensive. Further, such a process can make it difficult to produce reliable records of the destruction.

A variety of items other than cards may also need to be destroyed in an efficient and documented manner. For example, an organization may be contractually obligated to destroy certain items provided under the terms of a confidentiality agreement. This destruction may need to be certified or verified in some manner.

Hence, this invention relates to systems and techniques that maybe used to destroy a wide variety of items. Further, the destruction may proceed in an efficient and documentable manner.

SUMMARY OF THE INVENTION

The invention provides systems and methods for destroying various types of items in an automated manner. The items may be destroyed after a reader reads some type of identification information that is associated with the item. This information may optionally be used to verify that the item is intended to be destroyed. The item is moved from the reader to a destruction device in an automated manner. Further, delivery to the destruction device is verified and a record is produced that may be used for auditing purposes.

Examples of items that may be destroyed in such a manner include financial instruments, such as charge cards, debit cards, checks, money orders, and the like. Other possible items include any documents, such as business documents, legal documents, financial documents, and the like. Further items may include prototypes, products, weapons, biological materials or samples, pharmaceuticals, medical items, contraband, illegal materials and the like.

A variety of sensing systems may be used to verify destruction of the items. Such sensing systems may include, for example, imaging systems that produce images of the items as they leave the reader and enter into the destruction device. In come cases, the imaging system may also image the associated identification information. The sensing system may alternatively comprise a sensor that senses when an item passes by it, such as by interrupting a beam that impinges on the sensor. Other types of sensing systems may be those capable of weighing the items to ensure that the item to be destroyed falls within an expected range of weights. This may be used in combination with a laser or similar sensor the may be used to indicate when the weight measurement should be taken. As another example, the size of the item may be measured to determine whether it is within a range of expected sizes. If an expected parameter is exceeded, a signal may be sent to a controller to stop the destruction process. Further, a variety of destruction devices may be used, such as shredders, cutters, incinerators, pulverizers, and the like.

In one embodiment, a card destruction system comprises a reader for reading identification information from a card. A controller is coupled to the reader to receive the identification information and to determine whether the card is to be destroyed. A delivery sensor is also coupled to the controller to sense when the card is delivered to a card destruction device. The controller uses the sensed information to produce a record of the destruction. In this way, an automated system is provided to confirm that a card is to be destroyed, to destroy the card, and to confirm that the card was in fact destroyed.

In one aspect, a moving system may be used to move the card through the reader and to the card destruction device. Such a moving system may be constructed of a plurality of rollers that may rotate in opposite directions to move the card through the system. For convenience of manufacture, an AC motor may be used to rotate rollers that are both upstream and downstream of the reader. A DC motor may also be used to rotate rollers that are associated with the reader. In this way, the controller may be used to stop rotation of the reader rollers (by stopping the DC motor) if a card has been read by the reader but a confirmation that the card is to be destroyed has not been received. In this way, the card is prevented from prematurely passing to the card destruction device. Conveniently, sensors may be provided just before and after the reader to track the location of the card as it enters and exits the reader.

In a further aspect, the system may include a feeding mechanism to feed individual cards from a stack of cards and to the moving system. The feeding mechanism may include a cam that is moved based on a signal from the controller to in turn move a card from the stack and into the moving system.

The card destruction system may also include a switch that is disposed along the moving system downstream of the reader to direct the card to the destruction device or to a holding location depending on the determination from the controller as to whether the card should be destroyed. In a further aspect, the record produced by the controller may include information such as the identification information, a time and date of destruction, the operator monitoring the destruction, and the like.

Hence, in use an operator simply needs to place a stack of cards that are to be destroyed into the feeding mechanism. Cards from the stack are then individually fed into the moving system where their identification information is read and checked to confirm that the cards are to be destroyed. If so, the cards are directed to the card destruction device where a sensor confirms their destruction.

DESCRIPTION OF THE SPECIFIC EMBODIMENTS

The invention provides systems and methods for destroying various items that may be documented. Such items may include cards or presentation instruments, such as credit cards, debit cards, phone cards, smart cards, loyalty cards, and the like. Such cards are typically constructed of a plastic material and may be destroyed by shredding devices, cutting devices and the like. However, it will be appreciated that the invention is not intended to be limited to a specific card type or destruction device.

For example, the invention may be used to destroy essentially any type of item that may be associated with some type of identification information that may be read and used to produce a record verifying the destruction. For instance, other types of financial instruments or documents that may be uniquely identified and destroyed include currencies, personal checks, gift checks, cashiers checks, official checks, money orders, rebates, and the like. As another example, the invention may be used to destroy any type of document containing identification information, such as a bates stamp number, a bar code, a specific header or footer, a watermark, or the like. For example, a series of documents that are marked with consecutive numbers (such as documents produced during litigation) may need to be destroyed along with a certificate of their destruction. Other types of items that may be identified and destroyed using the invention include government or classified documents, passports, drivers licenses, confiscated items, pharmaceuticals, medical devices, weapons, vehicles (as identified by VIN numbers), court documents, internal corporate documents, and the like.

The systems and methods may be automated so that an operator may destroy multiple items simply by placing them into the destruction system and actuating the system. The system may automatically read information from or associated with the item and then optionally check a database to confirm that the item is in fact to be destroyed. This information may be read from a mag stripe, a smart card, a label, an embossing, printed media or the like. Optionally, if a confirmation that the item is to be destroyed is received, the item is delivered to a destruction device for destruction. Further, final delivery of the item to the destruction device is sensed by a sensing system to permit a record to be produced of the destruction. Such a record may include the identification number, the account number, the time of destruction, the operator overseeing the destruction, and the like. This record may be maintained in a database so that it may be electronically transmitted to an interested party.

Figure 1:
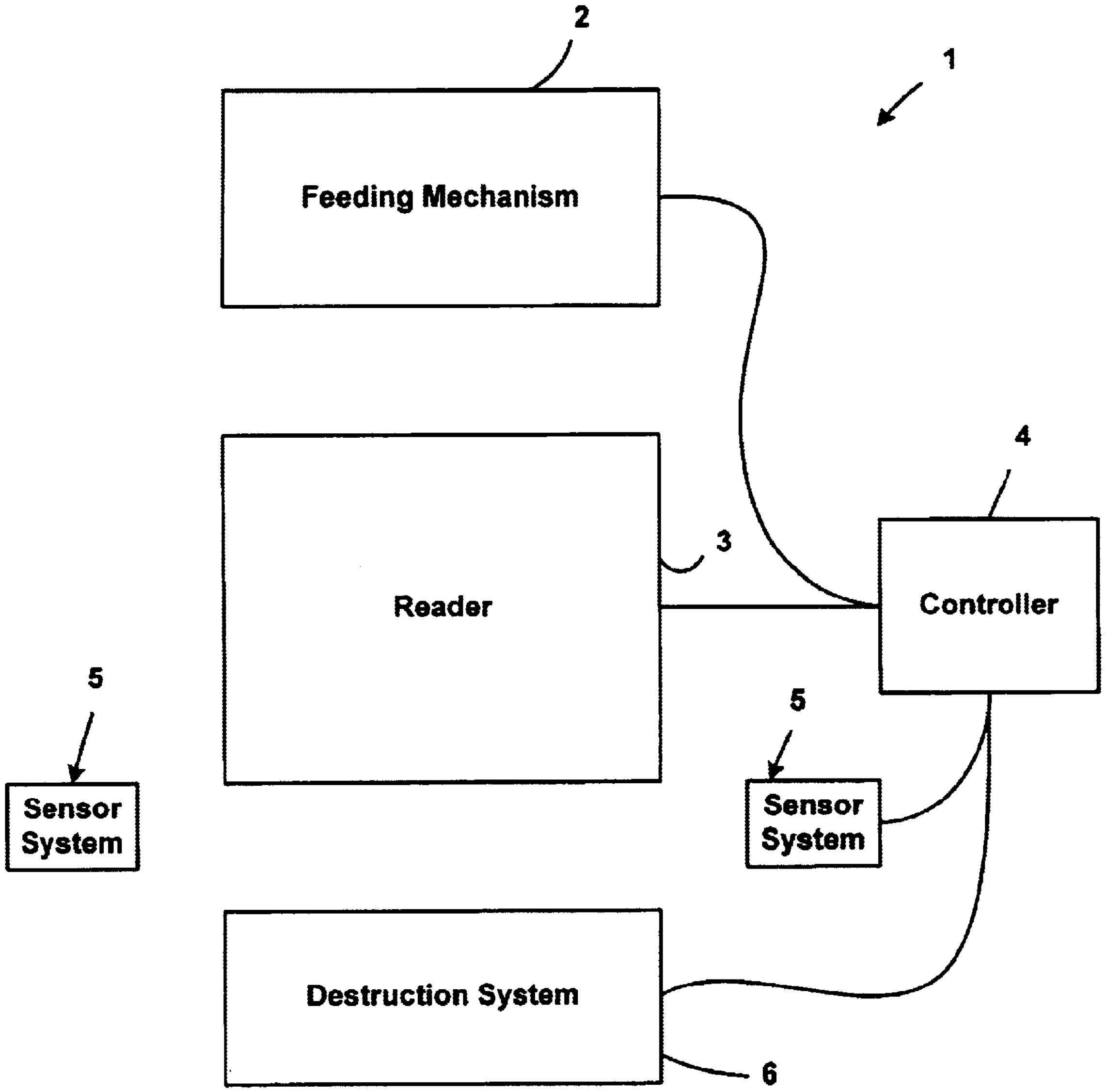
FIG. 1 is a schematic diagram of an item destruction system according to the invention.

One example of a destruction system 1 that may be used to destroy items and to document their destruction is illustrated in FIG. 1. System 1 may optionally include a feeding mechanism 2 that is used to feed items in an automated manner to a reader 3. For example, in the case of documents, feeding mechanism 2 may comprise a bin or tray for holding a stack of documents, and a set of rollers that may be used to individually move documents from the stack and to reader 3. This process may be similar to those used in laser printers, copier machines, and the like. Optionally, one or more sensors may be used to ensure that a document or item removed from feeding mechanism 2 actually enters reader 3. Other types of feeding mechanisms that may be used include conveyors, tracks, and the like.

Conveniently, a controller 4 (such as a computer) may be used to control operation of feeding mechanism 2, including any sensors used to track movement of items. Controller 4 may also be coupled to reader 3 to control its operations as well as to store information regarding the destruction.

Reader 3 may include a moving system that takes items from feeding mechanism 2 and passes them by or through some type of reading device to read identification information associated with the item. This information may then be transmitted to controller 4 for recordal. In some cases, controller 4 may include a record of items that are to be destroyed and a comparison may be made to insure that the item in reader 3 is intended to be destroyed.

Reader 3 may utilize a wide range of reading devices to read information associated with each item. For example, reader 3 may utilize an optical character recognition scanner (OCR), a MICR reader, a smart card reader, a magnetic stripe reader, a digital scanner, or the like. As each item passes through reader 3, its identification information is read and transmitted to controller 4 so that a record may be made of this item, the time of reading, the operator running the system, and the like.

After passing through reader 3, a sensor system 5 is employed to verify that the item passes into a destruction system 6. In this way, the item may not be removed from the system after being read without a record of its removal being produced. Examples of sensing system that may be used include light sensors that sense a beam of light, such as from a laser. If this beam is broken, it is assumed that the item has passed through the beam so that a record of destruction may be produced. As another example, a camera may be used to photograph the area between reader 3 and destruction system 6. In this way, a continuous monitoring of the destruction may occur. Further, in some cases, the camera may also capture the identification information and may be used to verify that a specific item was destroyed as well as its time of destruction.

Various levels of security may also be provided so that the item may not be removed from the system of the passing through reader 3. In this way, destruction of an item that has been read by reader 3 may also be ensured so that sensor system 5 may not be required.

A variety of destruction systems may be used depending on the type of item being destroyed. For example, documents may be destroyed by an incinerator, a shredder, a cutter, or the like. For other types of items, destruction systems, such as crushers, grinders, chemical baths and the like may be used. Further, the destruction systems may completely destroy the items or just render them unsatisfactory for their intended use.

Figure 2:
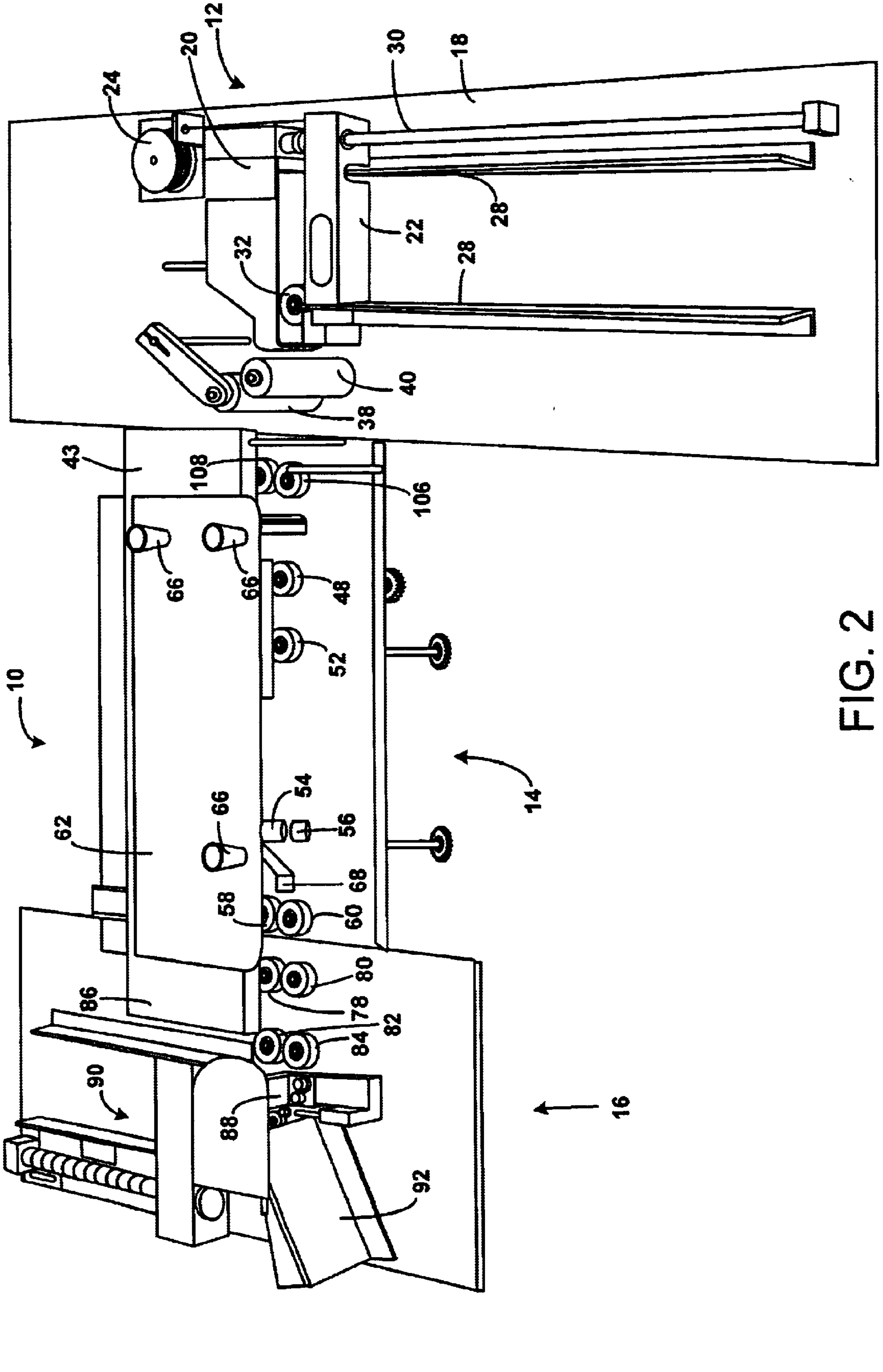
FIG. 2 is a front perspective view of one embodiment of a card destruction system according to the invention.
Figure 3A:
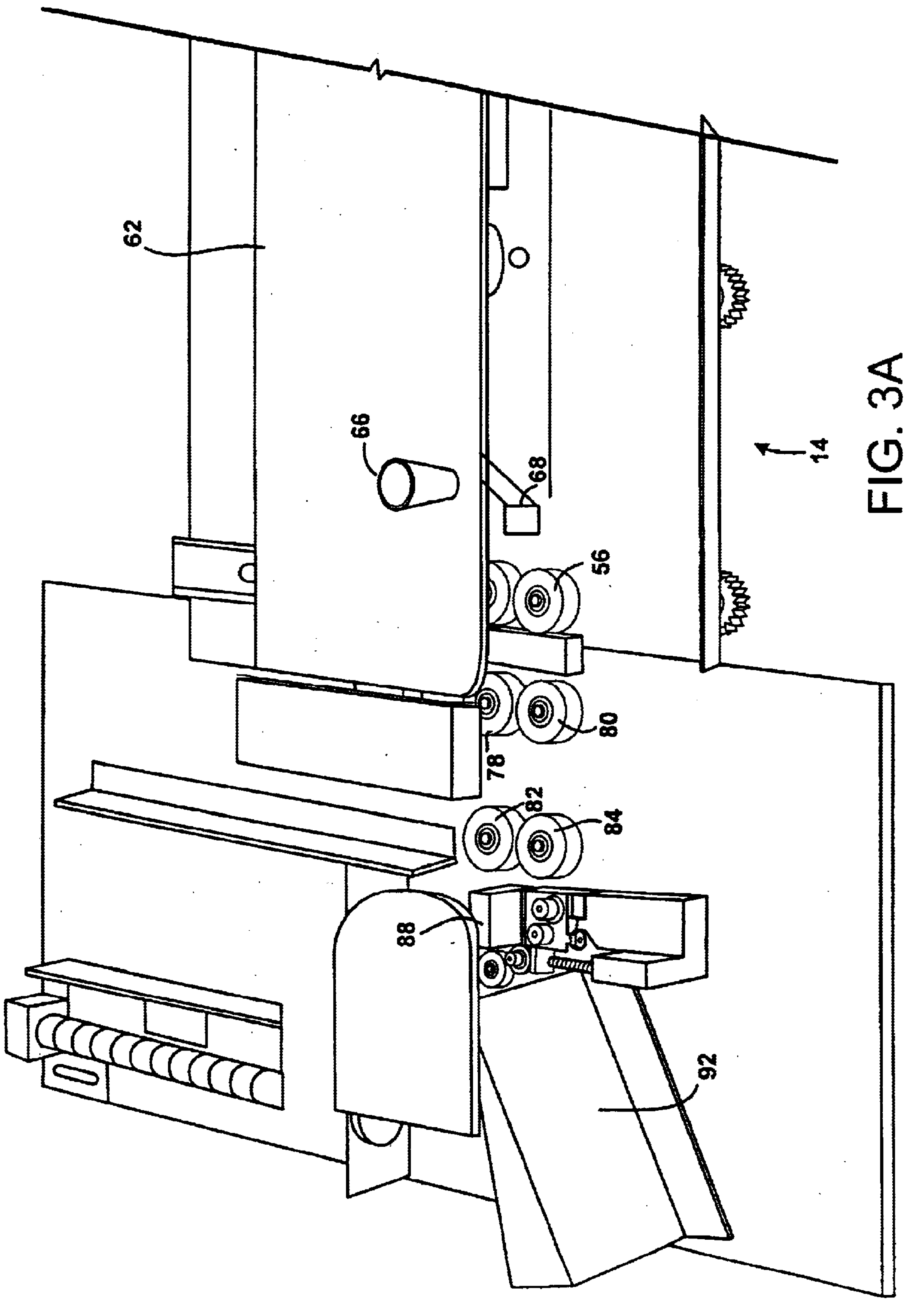
FIG. 3A is a more detailed view of a left-hand side of the card destruction system of FIG. 2.
Figure 3B:
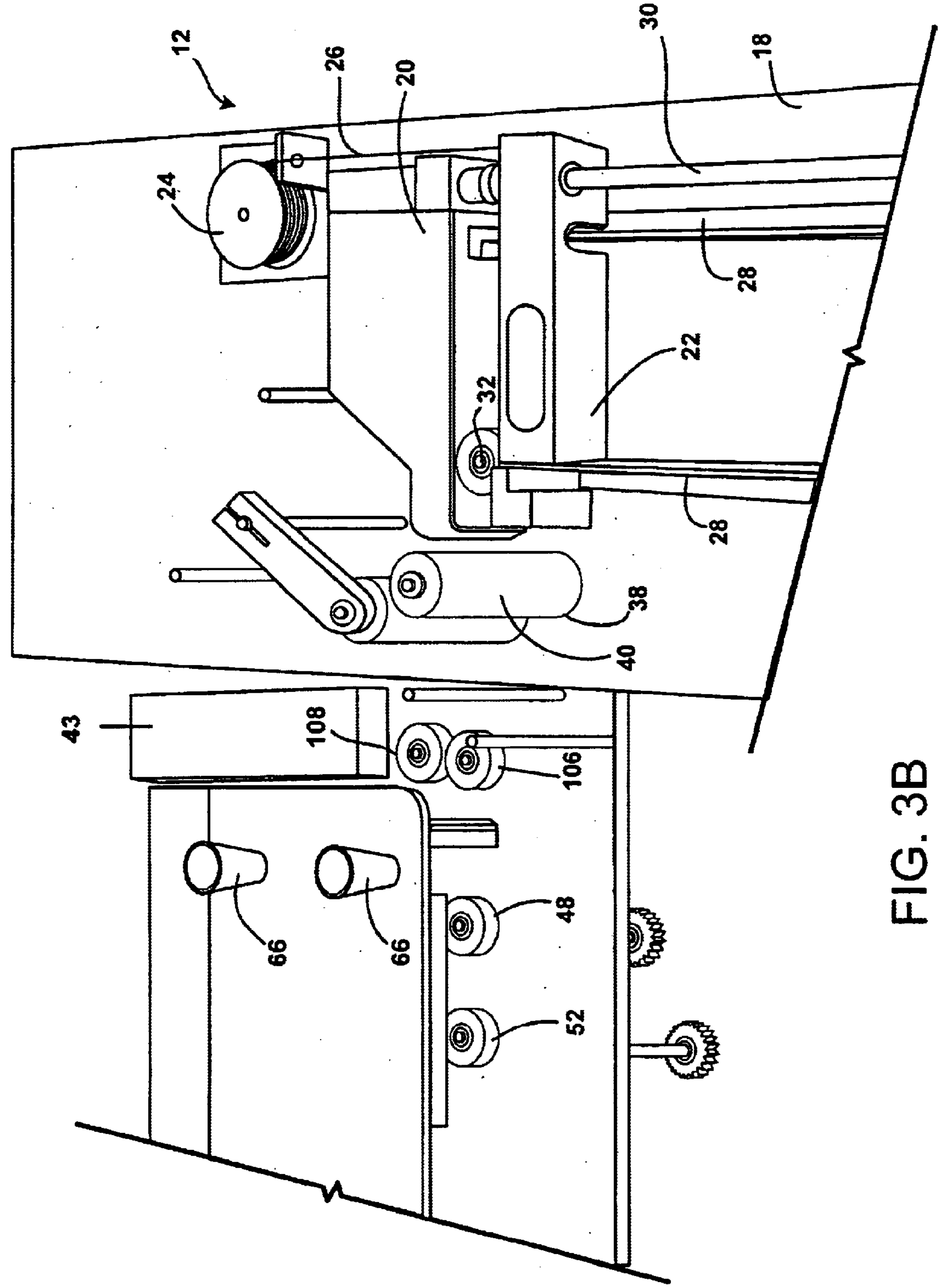
FIG. 3B is a more detailed view of a right-hand side of the card destruction system of FIG. 2.

Referring now to FIGS. 2, 3A and 3B, one embodiment of a card destruction system 10 will be described. System 10 may conveniently be defined in terms of a card feeding portion 12, a card reading portion 14, and a card disposition portion 16. As best shown in FIGS. 2 and 3B, card feeding portion 12 rests on a base 18 and comprises a holder 20 onto which a stack of cards may be placed. Spaced apart from holder 20 is a biasing plate 22 that is biased toward holder 20 by a spring-loaded spool 24 having a length of wire 26 that is coupled to plate 22. In this way, the stack of cards is held between holder 20 and plate 22. As individual cards are removed from the stack, plate 22 moves closer to holder 20 to firmly hold the stack of cards against holder 20. Conveniently, card feeding portion 12 includes a pair of rails 28 between which the stack of cards are placed, and a rod 30 that acts as a guide or track for plate 22 as it moves toward and away from holder 20.

When a stack of cards is placed onto holder 20, the bottom card rests on a roller 32 having a cam (hidden from view). Roller 32 is rotated by a solenoid 34 (see FIG. 6) to cause the cam to engage the bottom card of the stack. In so doing, the bottom card bends sufficiently to permit the cam to move past the bottom card. After the cam passes the card, the card springs away from the stack and is moved by another roller 36 (see FIG. 4) which moves the card to another pair of rollers 38 and 40 which move the card to card reading portion 14. Hence, card feeding portion 12 is configured to separately introduce individual cards to card reading portion 14. As described in greater detail hereinafter with reference to FIG. 8, a controller 42 is employed to operate solenoid 34 to control the feeding of cards to card reading portion 14. A presence sensor 43 is employed to sense when a card has exited card feeding portion 12 and entered into card reading portion 14. Controller 42 may utilize the information from sensor 43 to reactuate roller 32 in case a card was inadvertently not removed from the stack.

Figure 4:
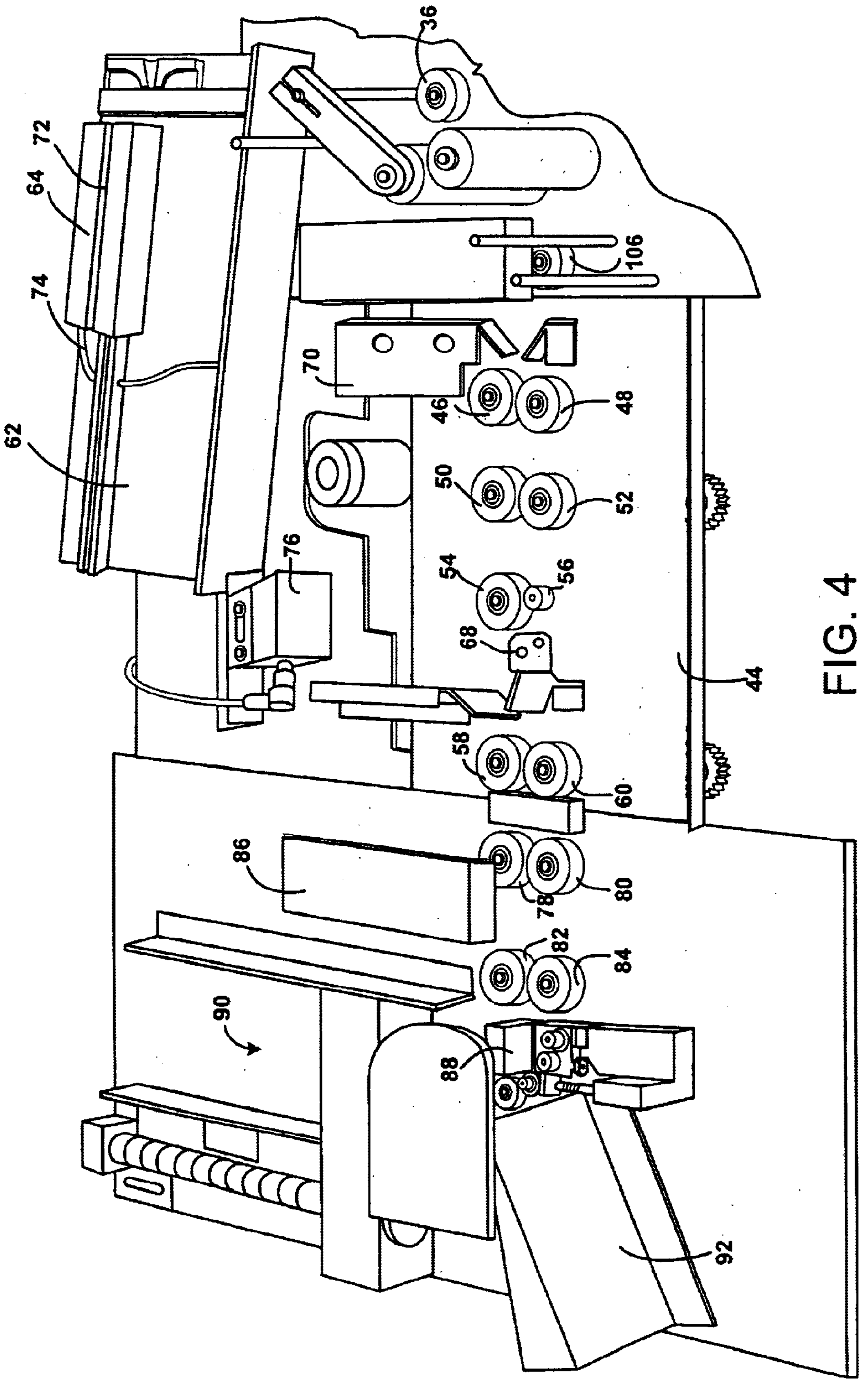
FIG. 4 illustrates a card reader portion of the card destruction system of FIG. 2 with a card reader being disassembled.
Figure 5:
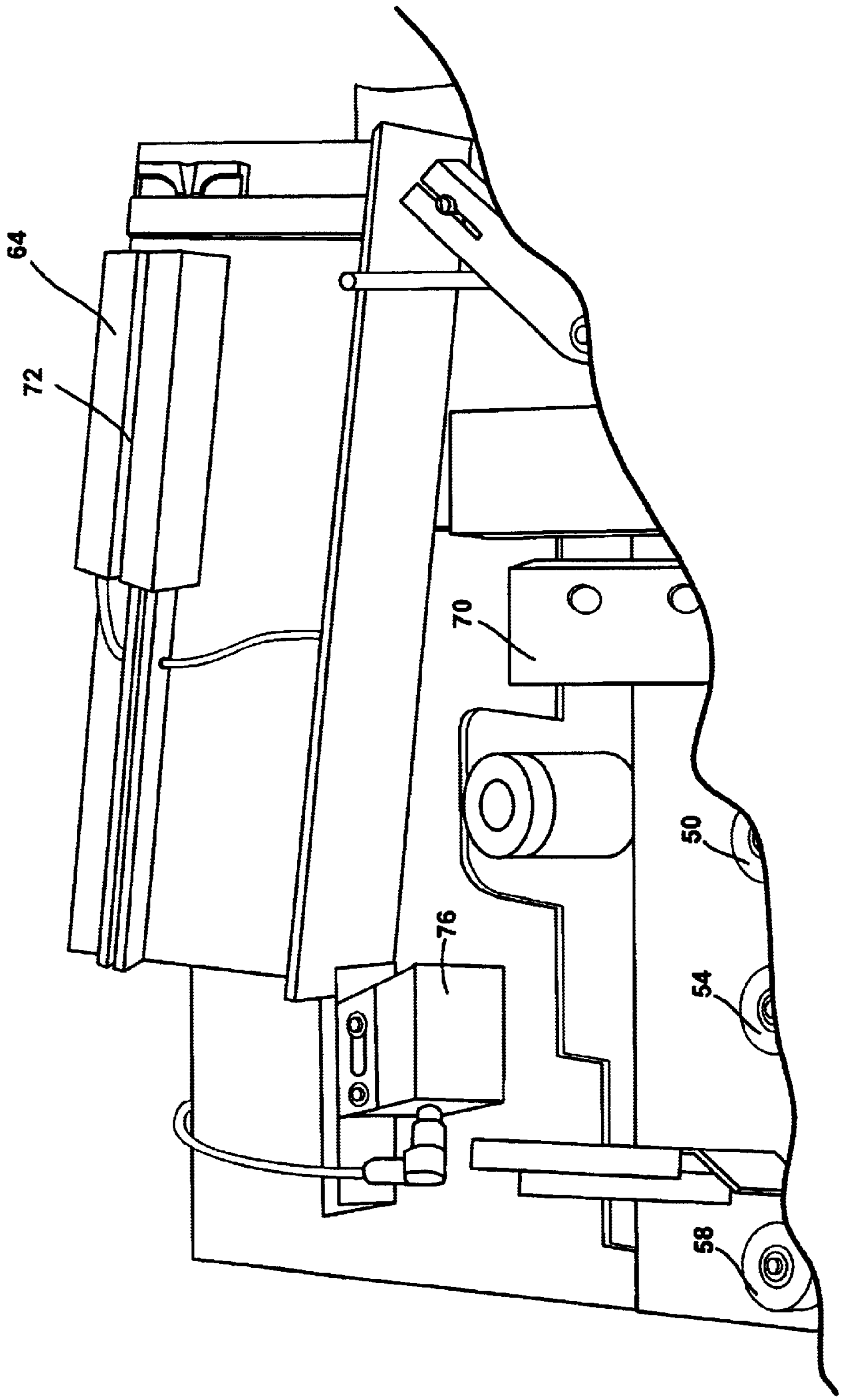
FIG. 5 is a more detailed view of the card reader of FIG. 4.

Referring also now to FIG. 4, card reading portion 14 will be described in greater detail. Card reading portion 14 also includes a base 44 along which are disposed various sets of rollers 46, 48, 50, 52, 54, 56, 58 and 60. Rollers 46–60 are arranged in pairs which rotate in opposite directions to move the card in an upright or vertical orientation along base 44. Coupled to base 44 is a lid 62 that includes a card reader 64 which is shown in greater detail in FIG. 5. Conveniently, a set of screws 66 may be used to couple lid 62 to base 44. Various brackets 68 and 70 may be coupled to base 44 to provide openings where screws 66 pass to securely couple reader 64 to base 44.

As the card is moved through card reading portion 14, it passes through a slot 72 in card reader 64. In this way, the information stored on the magnetic stripe of the card is read and passed to controller 42 (see FIG. 8) via an electrical cable 74 (see FIG. 4). Although shown with a card reader that is configured to read magnetic stripes from cards, it will be appreciated that other types of readers may be used, such as, for example, readers for reading smart chips. Cable 74 is employed to transmit the information to controller 42. As described in greater detail hereinafter, this information is used to determine whether or not the card is to be destroyed. A presence sensor 76 is employed to sense the presence of the card after it passes through reader 64. As described hereinafter, sensor 76 may send a signal to controller 42 to indicate the presence of the card at the end of card reading portion 14. In this way, if the controller has not yet determined whether or not the card should be destroyed, the controller may stop operation of rollers 58 and 60 so that the card does not continue to card disposition portion 16.

Card disposition portion 16 includes pairs of rollers 78, 80, 82 and 84 that rotate in opposite directions similar to the other rollers described to continue movement of the card through card disposition portion 16. Another sensor 86 is employed to sense once the card enters into card disposition portion 16.

Figure 6:
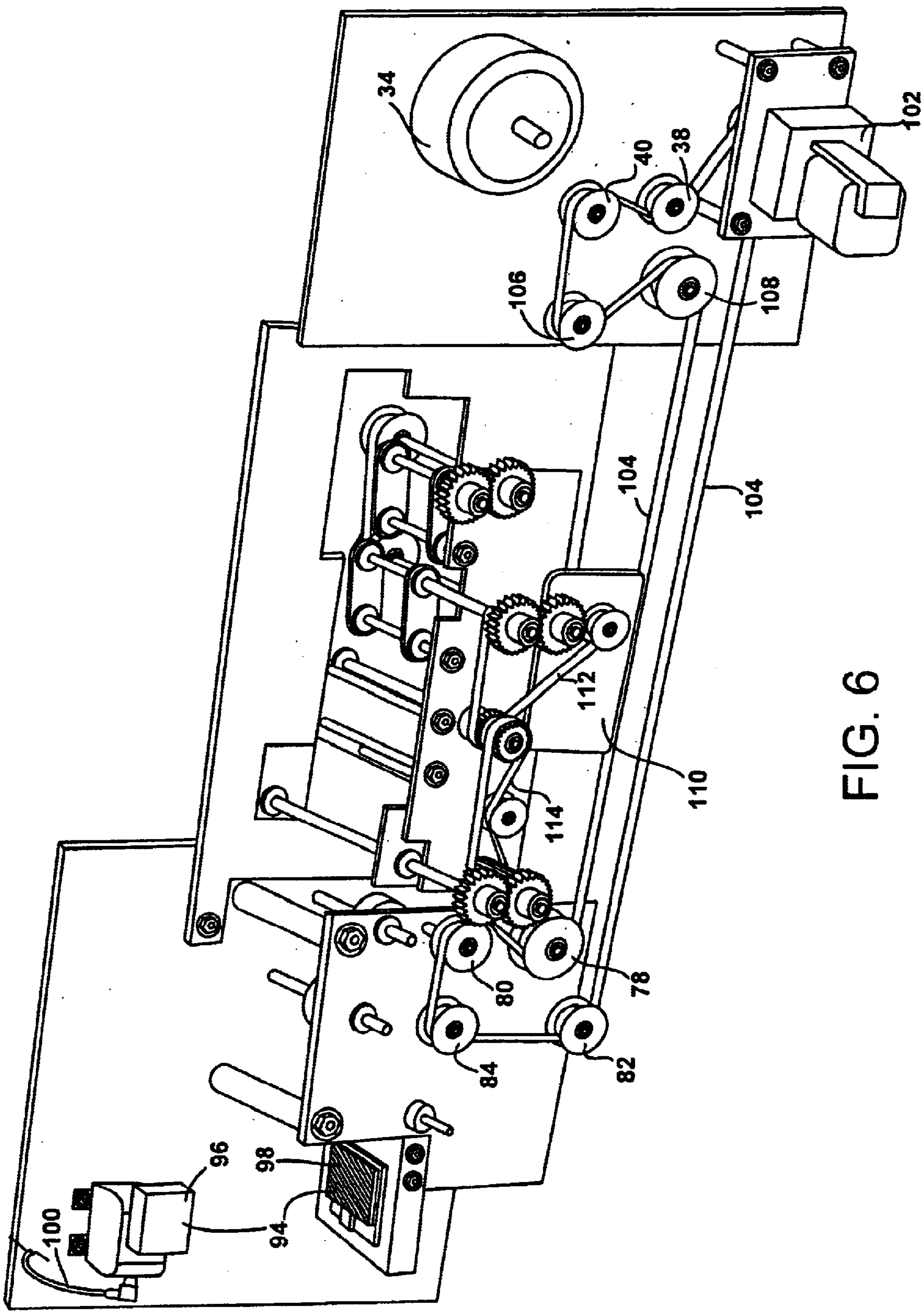
FIG. 6 is a bottom perspective view of the card destruction system of FIG. 2.
Figure 7:
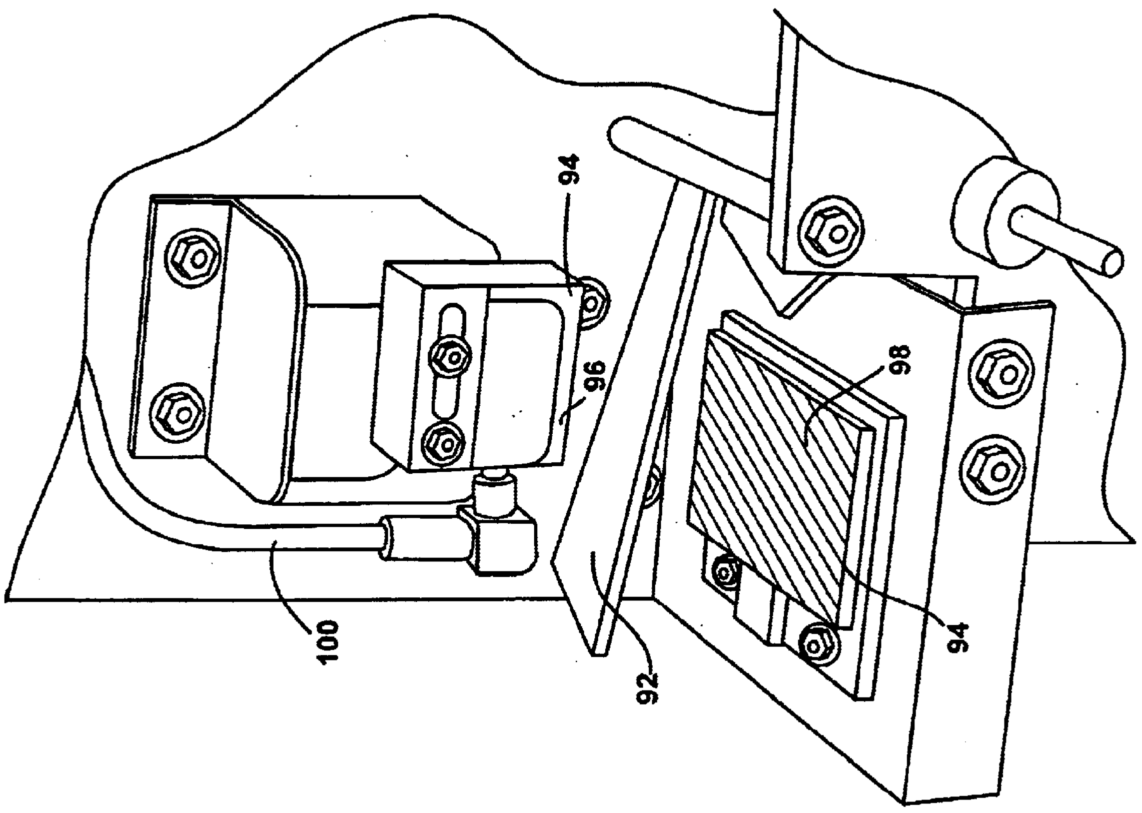
FIG. 7 is a detailed view of a sensor employed to sense when a card has been destroyed.

Rollers 82 and 84 move the card toward a flipper 88 that pivots back and forth to direct the card either toward a card destruction device or into a holding bin 90 depending on whether or not the card is to be destroyed. Flipper 88 is moved based on operational signals from the controller. If the card is to be destroyed, it is directed by flipper 88 into a chute 92 where it falls through the air into a card destruction device, such as a shredder (not shown). As best shown in FIGS. 6 and 7, a phase shift sensor system 94 is disposed to detect when the card falls through the air and into the card destruction device. Sensor system 94 is constructed of a light source 96 and a phase shift reflector 98. An electrical cable 100 is employed to send the sensed signal back to the controller where a record of the card destruction may be recorded.

Referring now to FIG. 6, a bottom view of system 10 is shown. System 10 further includes an AC motor 102 that is coupled to a belt 104 that in turn is used to rotate various rollers of system 10. Motor 102 may be configured to continuously operate so that the rollers in contact with belt 104 continually rotate. More specifically, motor 102 is employed to continuously rotate rollers 38, 40, 78, 80, 82, 84 as well as rollers 106 and 108 in card feeding portion 12. One or more DC motors 110 are employed to rotate belts 112 and 114 to rotate the rollers within card reading portion 14. By utilizing a DC motor, the rollers within card reading portion 14 may easily be stopped, such as when needed if information regarding whether the card is to be destroyed or not has not yet been received back from the controller.

Figure 8:
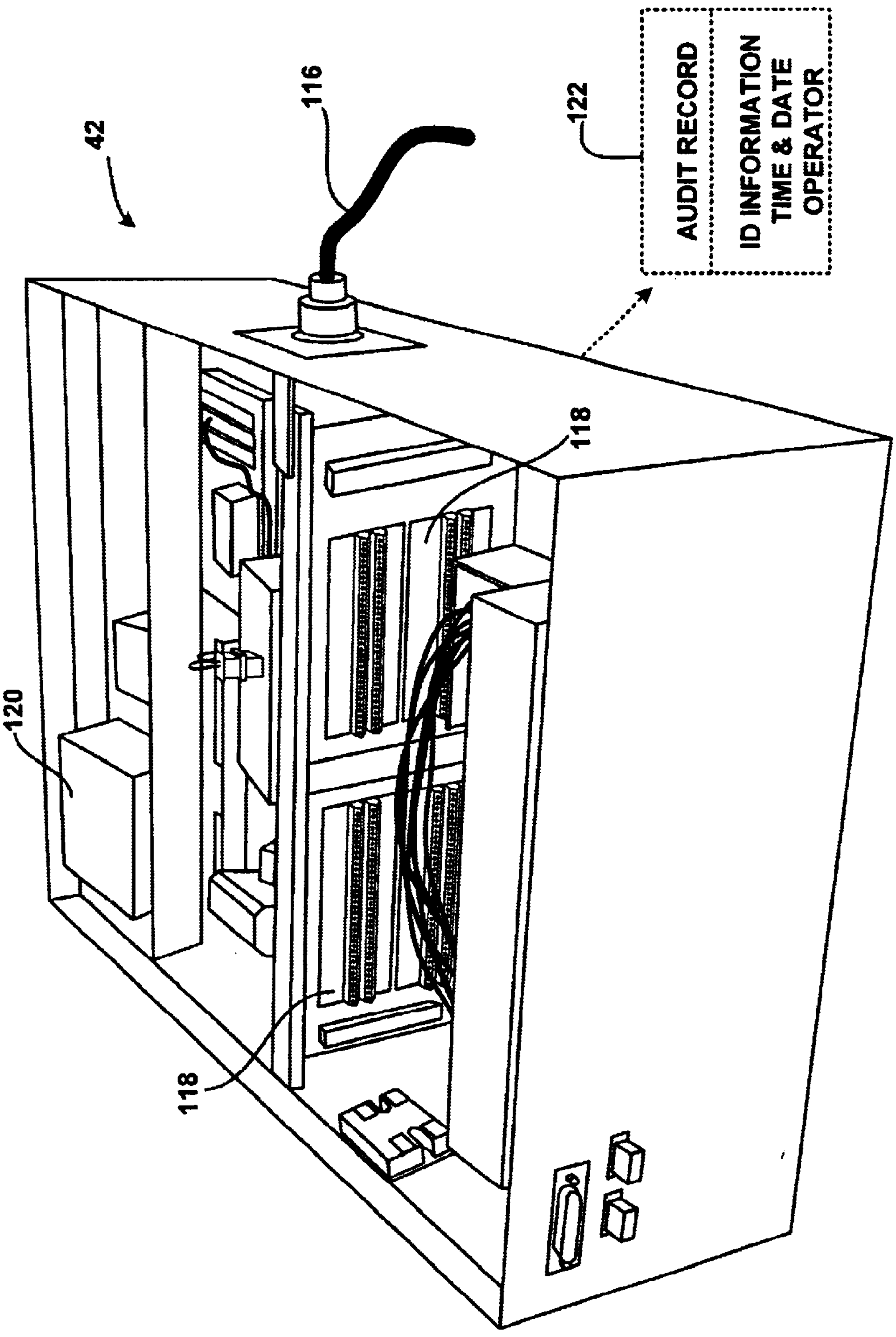
FIG. 8 is a perspective view of a controller employed to control the card destruction system of FIG. 2.

Referring now to FIG. 8, construction of controller 42 will be described in greater detail. Controller 42 includes cabling 116 to permit communication with the various sensors, readers, motors, and the like as previously described. Controller 42 may also include one or more boards 118 to control the operation of various components of system 10. A power supply 120 is also provided to supply power to controller 42.

In operation, a stack of cards is placed into card feeding portion 12 by distancing plate 22 from holder 20. System 10 is then actuated by use of controller 42 which begins operation of AC motor 102 and DC motor 110. Further, the controller causes roller 32 to rotate to dispense a card from the stack where it is grabbed by the various rollers and moved to card reading portion 14. In so doing, sensor 43 detects whether a card has been removed from the stack and advanced to card reading portion 14. If not, controller 42 reactuates roller 32 to supply another card from the stack. As the card passes through reader 64, information is read from the card and passed to the controller 42. Controller 42 then accesses a database (which may be a remote computer) to determine whether or not the card has in fact been flagged for destruction. If the card reaches sensor 86 before this determination is made, controller 42 stops operation of DC motor 110 to maintain the card within card reading portion 14. Once a decision as to whether the card is to be destroyed or not is made, the card is permitted to pass to card disposition portion 16 where controller 42 controls operation of flipper 88 to direct the card either into holding bin 90 or into chute 92. The cards within bin 90 are those which are not to be destroyed and are permitted to be collected. On the other hand, if the card passes into chute 92 it falls through the air into a card destruction device. As it falls through the air, sensor system 94 senses the presence of the card and sends a signal to controller 42 where a record is made of the destruction. In this way, an audit record 122 (FIG. 8) is produce to show that the card was actually destroyed. Further, the controller may have an input device where information on the operator is entered so that the record will also have information on the operator running system 10 when the card was destroyed. Controller 42 may also include a timer to record the date and time of the card destruction.

Sensor 86 may also be used to send a signal to the controller to indicate that system 10 is ready to receive another card from the stack. As such, the controller sends another signal to roller 32 to place another card into the system. In this way, the cards are automatically fed from the stack through the reader and to the card destruction device if the cards are to be destroyed. At the same time, a record is automatically created and stored showing the actual destruction of the card.

The invention has now been described in detail for purposes of clarity and understanding. However, it will be appreciated that certain changes and modifications may be practiced within the scope of the appended claims.

What is claimed is:

1. An item destruction system, wherein each item to be destroyed is identified by identification information thereon, the system comprising:

a reader that is configured to read identification information associated with an item that is to be destroyed;

a controller that is coupled to the reader, wherein the controller is configured to receive the identification information in order to identify the item and store the identification information; and a sensing system coupled to the controller to sense delivery of the item to a destruction device;

wherein the controller is further configured to produce an automatic record of the destruction based on the identification information and in response to a signal from the sensing system.

2. A system as in claim 1, further comprising a moving system to move the item through the reader an to the destruction device.

3. A system as in claim 2, further comprising a feeding mechanism that is configured to feed individual items from a group of items to the moving system.

4. A system as in claim 2, further comprising an entry sensor that is coupled to the controller to sense when a card has entered the moving system, and an exit sensor coupled to the controller to sense when the card has exited the reader.

5. A system as in claim 1, wherein the controller includes a record of items to be destroyed, and wherein the controller is configured to determine whether the item is to be destroyed based on the identification information.

6. A system as in claim 1, wherein the item comprises a financial instrument.

7. A system as in claim 6, wherein the financial instrument is selected from a group consisting of financial cards, checks, and money orders.

8. A system as in claim 1, wherein the item comprises a legal document.

9. A system as in claim 1, wherein the item comprises a consumer good.

10. A system as in claim 1, wherein the item includes a storage medium for storing the identification information.

11. A system as in claim 1, wherein the record produced by the controller includes the identification information, a date and time of destruction, and operator information.

12. An item destruction system, wherein each item to be destroyed is identified by identification information thereon, the system comprising:

a reader that is configured to read identification information associated with an item to be destroyed;

a controller that is coupled to the reader, wherein the controller is configured to receive the identification information in order to identify the item and store the identification information;

an item destruction device that is configured to receive and destroy items after being read by the reader; and a sensing system coupled to the controller to sense delivery of the item to the item destruction device;

wherein the controller is further configured to automatically produce a record of the destruction based on the identification information and in response to a signal from the sensing system.

13. A system as in claim 12, wherein the item destruction device is selected from a group consisting of shredder and an incinerator.

14. A system as in claim 12, wherein the sensing system is selected from a group consisting of optical sensors and visual imaging devices.

15. A method for destroying items, wherein each item to be destroyed is identified by identification information thereon, the method comprising:

reading identification information associated with an item using a reader;

sending the item from the reader to a destruction device; and verifying delivery of the item to the destruction device with a sensing system; and producing an automatic record of the destruction with a computer based on the identification information.

16. A method as in claim 15, further comprising moving the item through the reader and to the destruction device with a moving system.

17. A method as in claim 15, wherein the destruction record includes the identification information, a date and time of destruction, and operator information.

18. A method as in claim 15, wherein the reading step comprises reading the identification information from media selected from a group consisting of printed media, magnetic media and digital media.

19. A method as in claim 15, further comprising determining with the computer whether the item is to be destroyed based on the identification information.

20. A method as in claim 15, wherein the item destruction device comprises a shredder or an incinerator, and further comprising destroying the item with the shredder or incinerator.

21. A method as in claim 15, wherein delivery of the item to the destruction device is verified by sensing the interruption of a beam or by imaging entry of the item into the destruction device.

22. A method as in claim 18, wherein delivery of the item to the destruction device is verified by measuring the approximate size of the item prior to entry of the item into the destruction device and comparing the measured size against an expected range of sizes.

23. A method as in claim 19, wherein delivery of the item to the destruction device is verified by measuring the approximate weight of the item prior to entry of the item into the destruction device and comparing the measured weight against an expected range of weights.

* * * * *